United States Patent Office 3,154,673
Patented Oct. 27, 1964

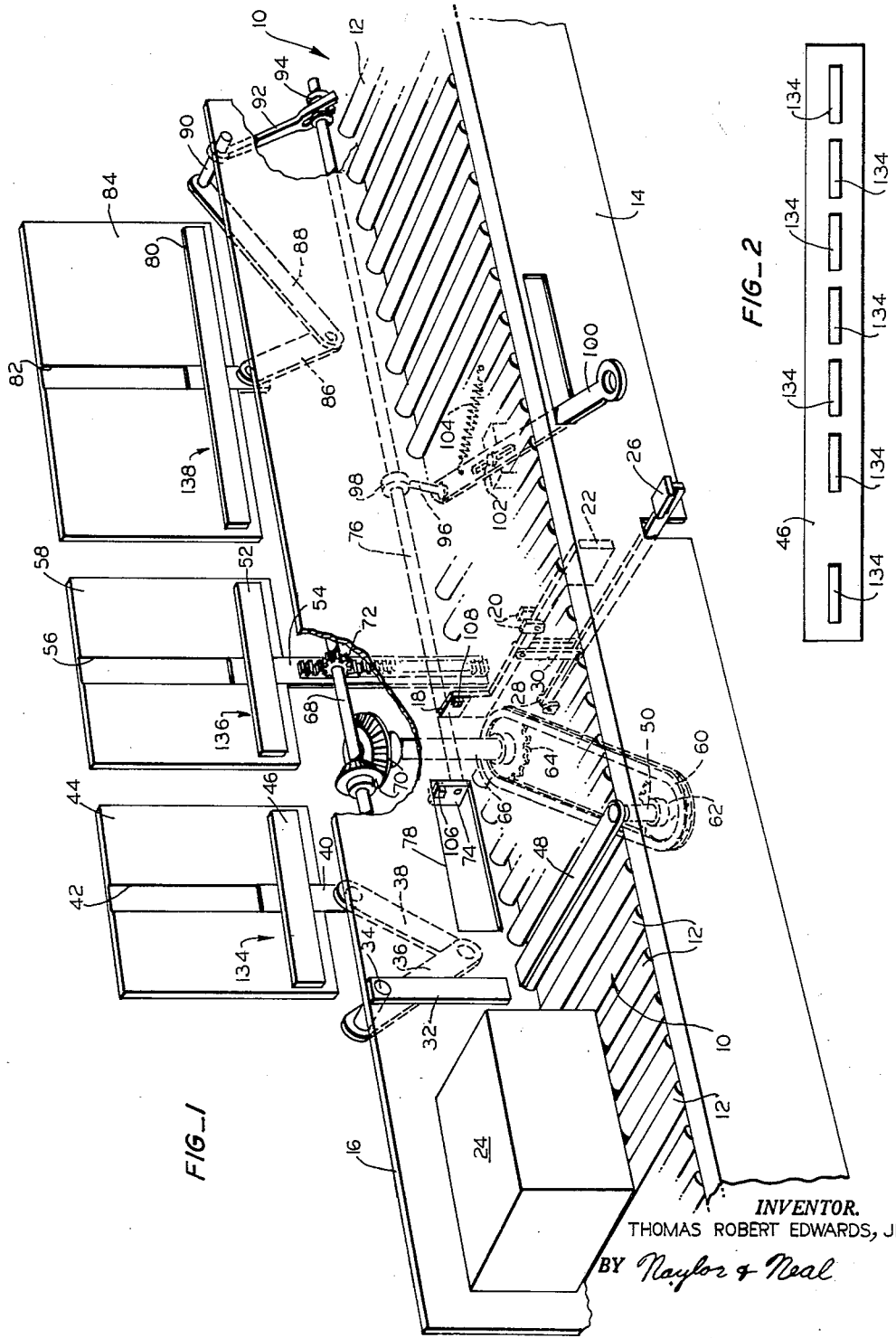

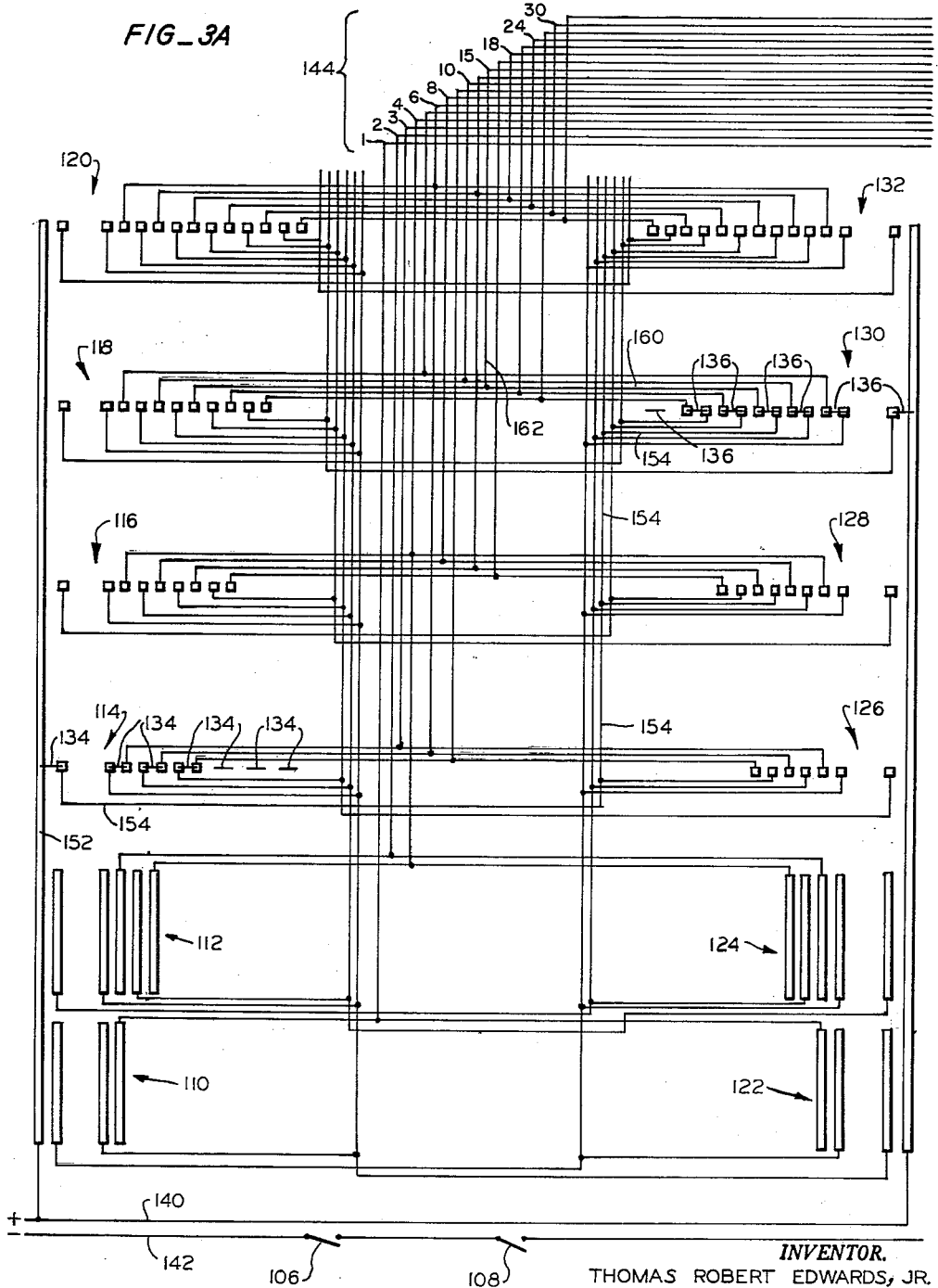

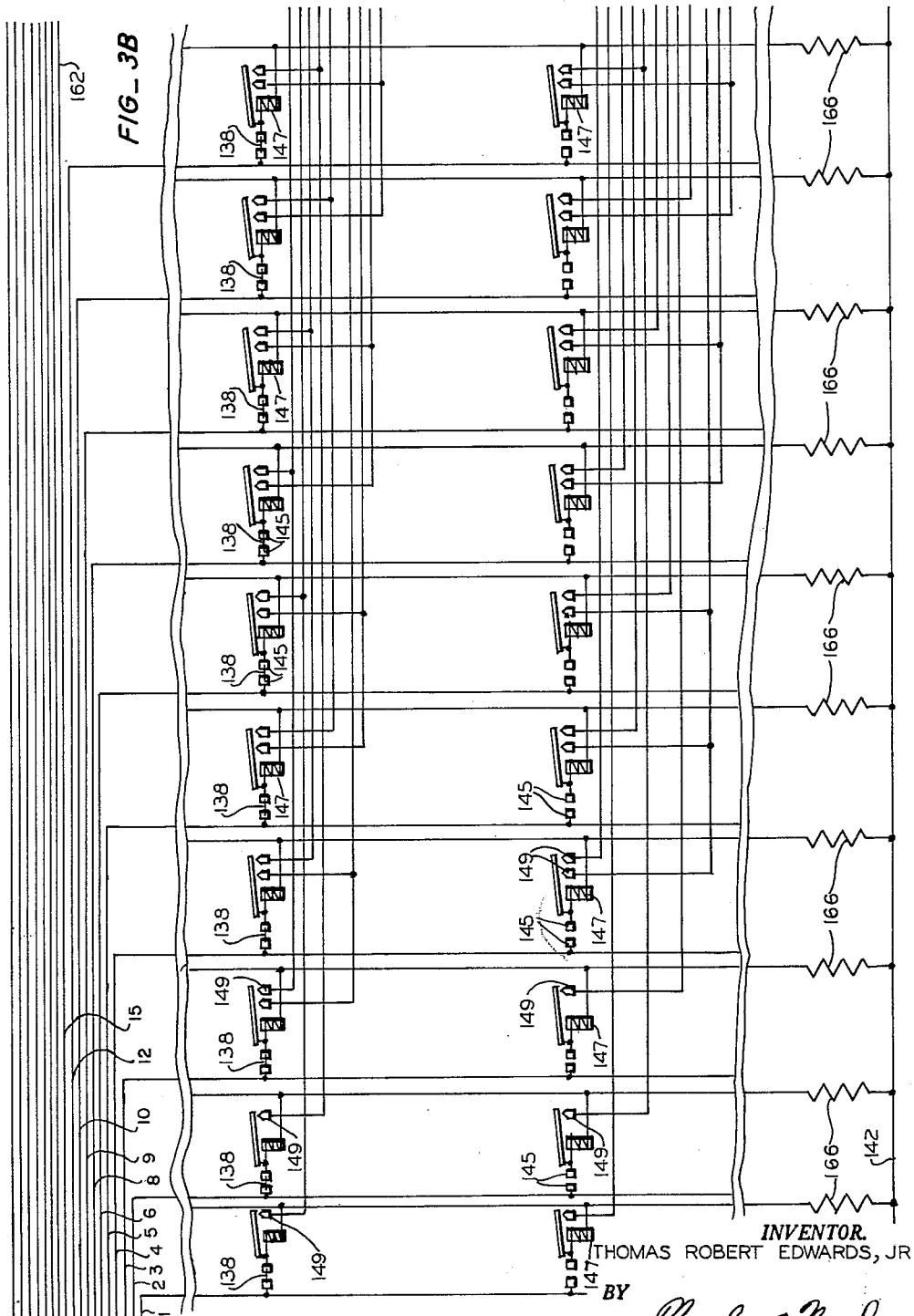

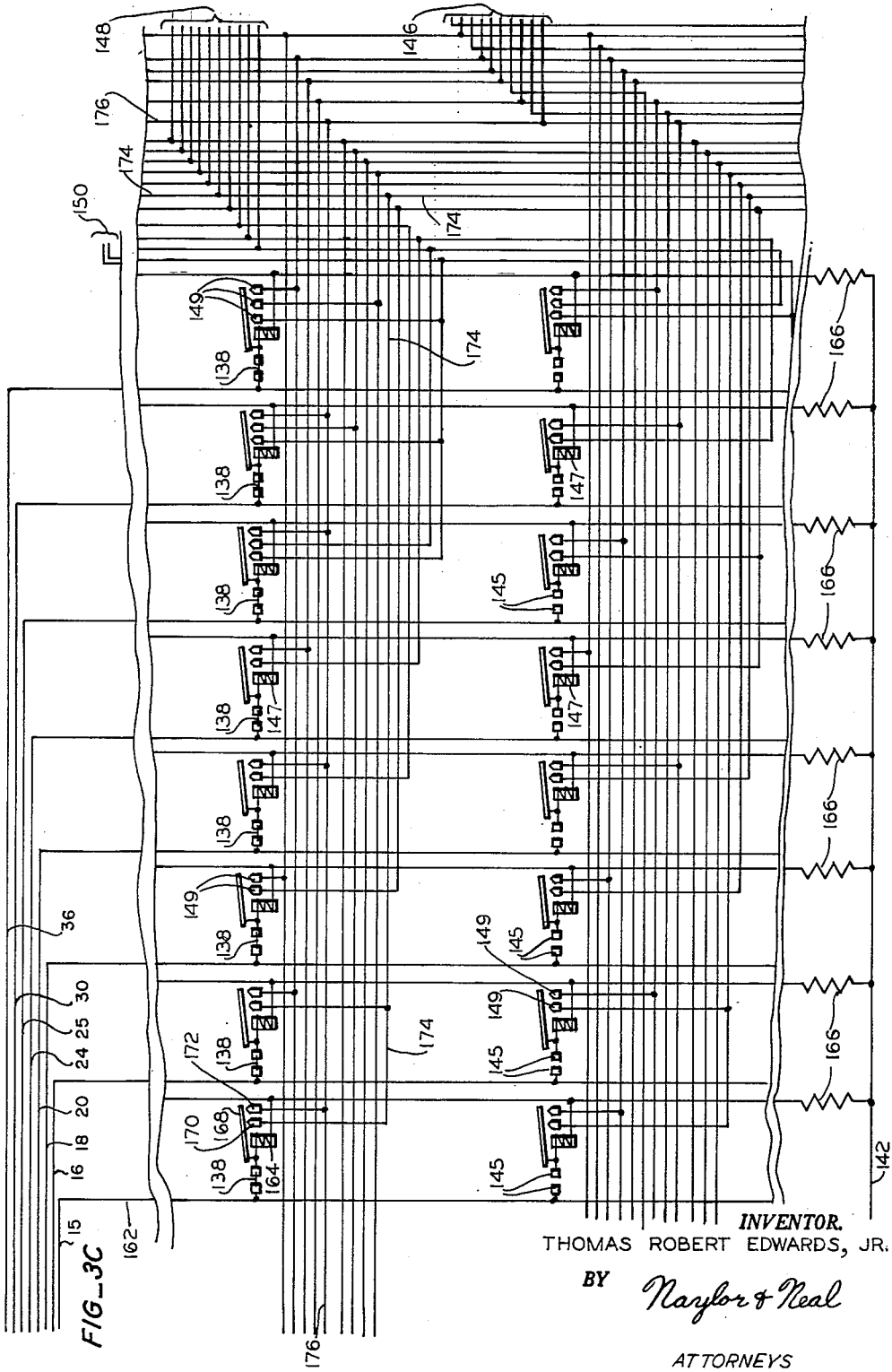

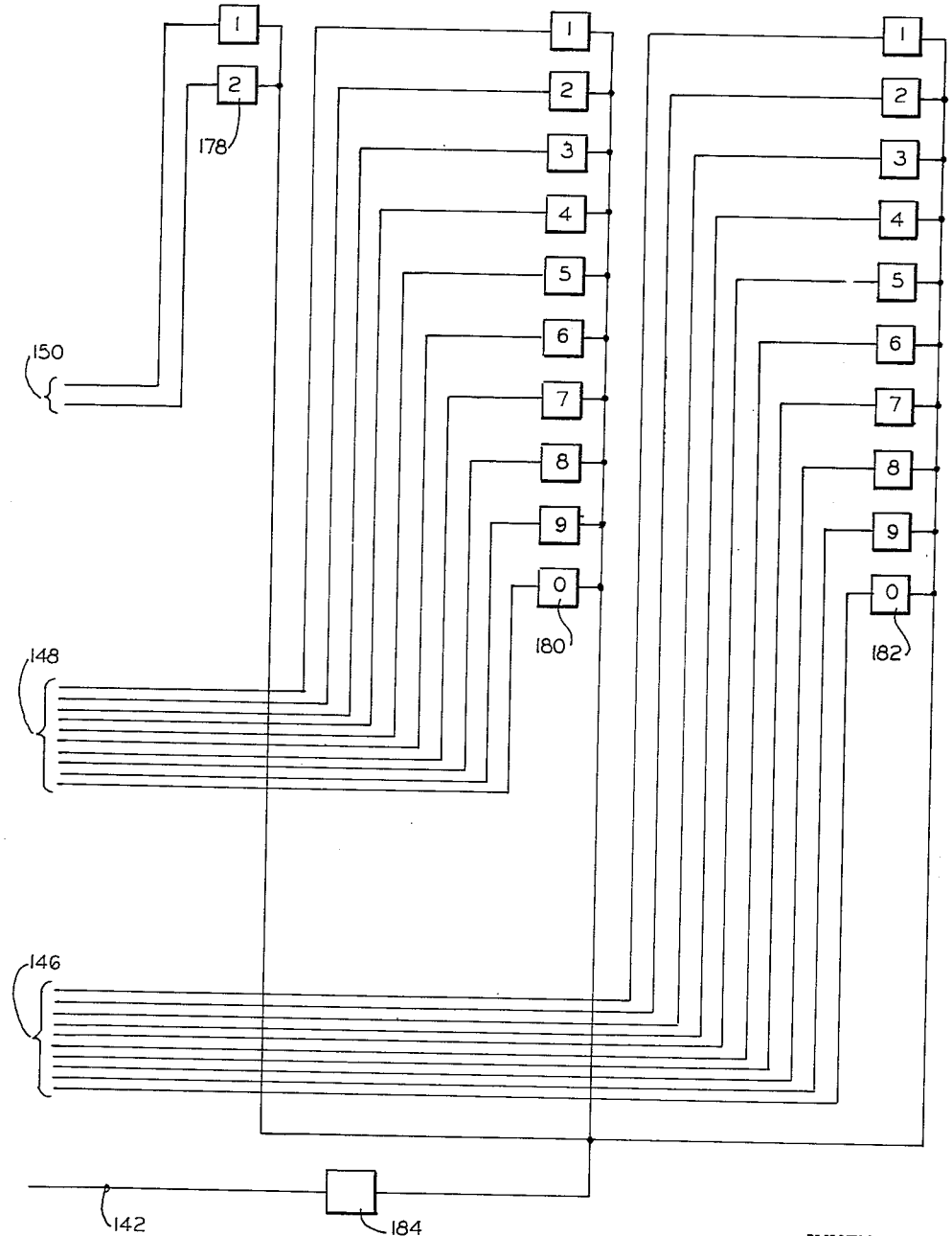

3,154,673
COMPUTING CALIPER
Thomas Robert Edwards, Jr., 555 Chelmsford Road,
Hillsborough, Calif.
Filed Nov. 29, 1960, Ser. No. 72,517
13 Claims. (Cl. 235—151)

This invention relates to measuring apparatus and more specifically to a device for measuring and utilizing the volume occupied by an article.

It is a principal object of this invention to provide an efficient device for measuring the volume of an article in order that such volume may be used as one criterion for freight rates for the transportation and storage of such articles, charges for freezing goods, etc.

It is another principal object of the invention to provide such apparatus with which the volume of a series of articles may be measured efficiently as the articles move relatively rapidly along a conveyor.

It is another object of this invention to provide such apparatus with which the volume of an article will be measured as the volume of the smallest rectangular solid which could contain the article, in order that the volume of the article will be measured as the volume of shipping or storage space which that article would occupy.

It is another object of the invention to provide such apparatus which may be easily coupled to an adding or calculating machine or computer to calculate the cumulative volume of a series of articles passing over a conveyor or accumulative record of the charges for processing the articles moving along the conveyor where the volume of the articles is one factor employed in computing such charges.

It is another object of the invention to provide such apparatus which includes an electrical calculator which is particularly useful in performing repetitive volume measuring operations.

It is another object of the invention to provide such an apparatus which is very simple to use and which can be used accurately by unskilled workers.

It is another object of the invention to provide such an apparatus which is simple and inexpensive to construct and maintain and which will be free from wear and have a long and useful life.

Other objects and advantages of the invention will become apparent from the following descriptions read in conjunction with the attached drawings in which:

FIG. 1 is a perspective view of apparatus constructed in accordance with this invention, the apparatus being illustrated partially schematically and partially broken away to show operating parts thereof;

FIG. 2 is a face view of one of the movable electric switching elements employed in the apparatus of FIG. 1;

FIGS. 3A, B and C are parts of a wiring diagram of the electrical calculating element of the apparatus illustrated in FIG. 1 with sections thereof omitted, these three figures being drawn to fit together to define a single wiring diagram with FIG. 3A upright and FIG. 3B extending horizontally from the right side of FIG. 3A and with FIG. 3C extending from the top end of FIG. 3B; and FIG. 4 is a wiring diagram of a suitable output panel to be employed in using or displaying the information derived through the wiring diagram of FIG. 3; FIG. 4 is drawn for its left side to fit against the top end of FIG. 3C.

Referring now in detail to the drawings and particularly to FIG. 1, an elongated conveyor 10 is constructed of rollers 12 mounted on front and back frame panels 14 and 16 respectively. The frame panels 14 and 16 may be interconnected by suitable structural members which for convenience are not shown. The rollers 12 may be rotated by suitable drive means to effect movement of articles on the conveyor to the right as illustrated in FIG. 1 if the particular installation of the apparatus may advantageously employ a power driven conveyor.

A releasable stop member 18 is mounted intermediate of the ends of the conveyor 10 by means of a pair of lugs 20 rigidly mounted underneath the conveyor and pivotally supporting the stop member 18. The stop member 18 is provided with a counterbalance 22 which holds the stop member 18 in operating position above the upper surface of the conveyor 10 to interrupt movement of articles, such as the carton 24, along the upper surface of the conveyor. A stop releasing pedal 26 protrudes through the front conveyor panel 14 and is pivotally connected to a pair of lugs 28 underneath the conveyor 10. The pedal 26 is connected to the stop member 18 by a link 30 by means of which manipulation of the pedal 26 effects retraction of the stop member 18 to a position below the top surface of the conveyor 10.

A vertical finger 32 is pivotally mounted on the rear conveyor plate 16 about an axle 34 to which is attached a bell crank 36 and a link 38. The link 38 is pivotally connected to a plate 40 which is vertically slidable in a channel 42 on a switching panel 44. A switch wiper 46 is attached to the plate 40 to be moved across the surface of the switch panel 44 responsive to movement of the finger 32 about its axle 34.

A horizontal finger 48 is pivotally mounted on the front conveyor panel 14 about an axle 50. Movement of the finger 48 effects movement of a switch wiper 52 mounted on a plate 54 which is in turn slidably mounted in a channel 56 on a second switch panel 58; this movement is effected by a roller chain 60 entrained over sprockets 62 and 64 which are connected to the axle 50 and a shaft 66 respectively; the shaft 66 effects rotation of a shaft 68 through bevel gears 70, and the shaft 68 effects reciprocal movement of plate 54 by means of rack and pinion 72.

It will be understood that as the container 24 passes along the conveyor 10, it will contact the fingers 32 and 48 and effect rotation thereof about their respective axles to effect progressive movement of the switch wipers 46 and 52 responsive to increases in the height and width of the container 24 respectively. In this manner the fingers 32 and 48 measure the height and width of articles passing along the conveyor in a plane generally perpendicular to the path of articles moving on the conveyor as the articles move to a position in engagement with the stop member 18.

The fingers 32 and 48 are of sufficient length, and the axles 34 and 50 are properly positioned so that the fingers 32 and 48 will be in engagement with the top and side of the carton 24 when the carton comes into contact with the stop member 18. The linkages connected to the fingers 32 and 48 may also be provided with releasable ratchet elements so that the fingers 32 and 48 may disengage from the carton before the carton contacts the stop 18; the ratchets will hold the switch wipers 46 and 52 at the maximum deflection caused by the carton 24. The fingers 32 and 48 may also be made in the form of large plates, each of which covers the entire height and width of the path over the conveyor so that the fingers measure the maximum dimensions of non-rectangular articles, for example cylindrical articles.

After the article 24 comes in contact with the stop member 18, the length of the article 24 is measured by means of a blade 74 which is mounted on an elongated rod 76 and which may also be in the form of a rectangular plate, etc. The rod 76 is mounted in suitable guideways for longitudinal movement along the length of the conveyor 10 and rotational movement about its axis so that the blade 74 may be moved along the length of a slot 78 in the conveyor backing plate 16 with the blade 74 mounted behind that plate, and rotation of the shaft 76 may effect pivoting of the blade 74 through the elongated slot 78 to engage the left-hand end of the carton 24. Thus, when the carton 24 has come in contact with the stop member 18, the elongated shaft 76 is moved to the left as illustrated in FIG. 1 until the blade 74 is visible beyond the lefthand end of the article 24. The shaft 76 is then rotated to pivot the blade 74 through the slot 78 to a position overlying the top surface of the conveyor 10 and the shaft 76 is then moved to the right until the blade 74 contacts the lefthand end of the article 24.

This movement of the shaft 76 and blade 74 is imparted to a switch wiper 80 mounted in a slot 82 on a third switch panel 84 by means of links 86 and 88, a shaft 90 pivotally mounted in the conveyor back plate 16, and a link 92 connecting the shaft 90 to a collar 94 on the shaft 76. It should be noted that the link 92 is provided with a fork engagement with the collar 94 to permit rotation of the shaft 76 while maintaining connection between the shaft 76 and the switch wiper 80.

Longitudinal and rotational movements of the shaft 76 are effected by means of an arm 96 rigidly attached to a collar 98 on the shaft 76 and carrying at its free end a ball-joint connection with a manipulating handle 100. The handle 100 is pivotally connected to a rigidly mounted pin 102 intermediate of its end, the pin 102 being slidably received in an elongated slot in the handle 100. Longitudinal movement of the shaft 76 is effected by moving the free end of the handle 100 to the left or right, and rotation of the shaft 76 is effected by pushing the shaft 100 toward the back plate 16 of the conveyor or pulling it forward to rotate the arm 96 about the axis of the shaft 76. A tension spring 104 is attached to the manipulating handle 100 to spring bias the shaft 76 into such a position that the carton length measuring blade 74 will be maintained at the right hand end of the slot 78 and rotated to a position behind the conveyor rear plate 16.

A pair of normally open limit switches 106 and 108 are provided on the adjacent faces of the blade 74 and the stop member 18 respectively positioned to be closed by contact with an article 24 when an article 24 rests against the stop member 18 and when the blade 74 is in position to measure the length of the article 24.

It will thus be seen that movement of an article 24 along the conveyor to a position in contact with the stop member 18 followed by manipulation of the handle 100 to place the blade 74 against the left hand end of the article 24 will effect movement of the switch wipers 46, 52 and 80 to positions which are related to the height, width and length respectively of the article 24. A plurality of groups of electrical switch contacts are provided on the switch panels 44, 58 and 84 positioned to be closed by the switch wipers 46, 52 and 80 respectively, each group of contacts on each panel being positioned to be closed for a particular unit of magnitude of the article's dimension which that panel is employed to measure. Thus, as indicated in FIG. 3, six groups of electrical contacts 110–120 are provided on the switch panel 44, each group corresponding to one of six units in the height of carton 24 to be measured by the finger 32. Obviously, additional groups of switch contacts may be provided for a device of sufficient capacity to measure larger articles or for a device of greater accuracy. In a similar manner six groups of contact 122–132 are mounted on the switch panel 58, and six groups of contacts are provided on the switch panel 84; for the sake of simplicity of illustration, only two of the groups of contact on the panel 84 are illustrated in FIGS. 3B and 3C, these two groups corresponding to the groups of switch contacts employed in measuring an article having dimensions of three and four units of length; the additional contacts for measuring the first, second, fifth, and sixth units would be located in the parts of FIGS. 3B and 3C which have been omitted. Obviously further groups of contacts with associated wiring connections could be employed on all of the panels 44, 58, and 84 for greater capacity and/or accuracy.

As illustrated in FIGS. 2 and 3, the switch wipers 46, 52, and 80 carry a plurality of electrical conductors 134 positioned to connect pairs of switch contacts in the various groups of contacts on the panels 44, 58 and 84. As illustrated in the switch contact groups 110, 112, 122 and 124 in FIG. 3A, the electrical contacts of each of the groups on the panels 44, 58 and 84 are of sufficient vertical length that they will automatically round off to the nearest integer the dimension being measured by the switch wiper which cooperates with them. Thus, the vertical spacing between the groups of contacts 110 and 112 is only slightly greater than the width of the contact 134 on the wiper 46, and the vertical length of each contact in the groups 110 and 112 is substantially greater than the width of the contact strip 134. The length of the electrical contacts in the groups 110–120, etc. may be suitably chosen to calibrate the device in any manner desired; thus, each dimension measured by the device may always be rounded off upwardly, or it may be rounded off upwardly half of the time and downwardly half of the time in accordance with the particular use intended for the device. Proper choice of the spacing and lengths of the contact strips in each group may provide particular adaptation of a given machine to measuring volumes of articles in accordance with a particular pattern of freight, storage, or processing rates, etc. It should be noted that for the sake of convenience in illustration in the drawings, the electrical contacts in the groups 114–120 and the groups 126–132 have been illustrated on a reduced vertical dimension, and the electrical switch contacts illustrated in FIGS. 3B and 3C have been illustrated on reduced vertical scale it being understood that all of the switch contacts may be of elongated vertical lengths as are the contacts of the groups 110, 112, 122, and 124.

In explaining how the elements of the electrical circuit illustrated in FIG. 3 cooperate to calculate the volume of the article being measured, it will be assumed that the article 24 has a height of three units, a width of five units and a length of four units. Accordingly, the electrical switch contacts of group 114 are illustrated in FIG. 3A as being connected by the conductor strips 134 on the switch wiper 46. The switch contacts of group 130 on switch panel 58 are illustrated as being connected by the conductors 136 on the switch wiper 52, and the switch contacts of the unit four group of contacts on the switch panel 84 are illustrated as being connected by the conductors 138 on the switch wiper 80.

Referring now broadly to FIG. 3, the electrical circuit employed for calculating the volumes of articles passing over the conveyor 10 comprises a pair of power leads 140 and 142 connected respectively to the positive and negative sides of a direct current power source; a set of partial product leads 144 are connected to the plus lead 140 through the switch contacts of the groups 110–132, and three sets of units, tens, and hundreds output leads 146, 148, and 150 respectively are connected to the partial product leads 144 through the switching arrangement of the switching panel 84 illustrated in greater detail in FIGS. 3B and 3C. The switching arrangement of FIGS. 3B and 3C includes a row of switch contact pairs 145 for each unit of the dimension measured on panel 84 with each row including a pair of contacts 145 positioned to connect each partial product lead to a relay 147 when a switch conductor 138 connects the contacts of the pair 145. Each of the relays 147 has its arm connected to one of its contacts 145 and positioned to close one or more contacts 149 to energize the output leads 146, 148, and 150. As illustrated in FIG. 4, the output leads are connected to the negative power lead 142.

In this manner the switches on the panels 44 and 58 cooperate together to energize a particular partial product lead 144 corresponding to the product of the dimensions measured by the fingers 32 and 48. This particular energized partial product lead 144 then cooperates with the particular pair of switch contacts on the panel 84 which are closed by the switch wiper 80 to energize selected hundreds, tens, and units output leads corresponding to the product of the number represented by the energized partial product lead and the number represented by the group of contacts on the panel 84 which are closed by the switch wiper 80.

Referring in greater detail to the electrical circuitry illustrated in FIG. 3, it will be noted that each of the groups of switch contacts 110–132 includes a first pair of contacts at the outside thereof by which the power line 140 is connected to the wiring between the panels 44 and 58. Referring specifically to the groups 114 and 130 of switches which are closed, power is supplied from the lead 140 through the contact strip 152 hence through the switch contact 134 and line 154, hence to the contact 156 on the panel 58, through the conductor strip 136 associated therewith, the contact 158, the lead 160 on the panel 58 to the partial product lead 162 which corresponds to the number "15" as a product of the two dimensions measured by the fingers 32 and 48. The partial product which each partial product lead 144 represents is indicated by the numeral directed thereto at the top of FIG. 3A and at the bottoms of FIGS. 3B and 3C.

The energized partial product lead 162 is then connected to the negative power line 142 by the conductor strip 138 on panel 84 and the coil 164 of a relay associated therewith and hence through a resistor 166 in series with coil 164. Energization of the coil 164 causes the relay arm 168 thereof to close, connecting the energized partial product lead 162 to the contacts 170 and 172 associated with the relay arm 168. The contact 170 is connected to the number 6 lead in the group of tens output leads 148 as indicated at 174 in FIG. 3C, and the contact 172 is connected to the zero lead of the units output leads group 146 as indicated at 176 in FIG. 3C.

In this way, the energization of a partial product lead corresponding to the product of two dimensions of the article 24 and the closing of a pair of switch contacts connected to that energized partial product lead actuate a relay which energizes output leads corresponding to the decimal product of the volume of the container 24. It should be noted that the circuits from the energized partial product lead through its corresponding relay to the negative side of the power source is accomplished through the lead 142 which contains the limit switches 106 and 108 on the container length measuring blade 74 and the releasable stop 18 respectively. Accordingly, the energized partial product lead will not close its corresponding relay or energize the output leads associated with that relay until the switches 106 and 108 are closed.

As illustrated in FIG. 4, the output leads 146, 148 and 150 are connected to suitable utilizing or displaying means by which the volume of the container 24 is entered in an adding or calculating machine or displayed for the machine operator to record. As illustrated in FIG. 4, output utilizing or displaying means comprises groups of electric current responsive elements 178, 180, and 182 for the "hundreds," "tens" and "units" numbers respectively in the volume of the container 24. Accordingly, the leads 150 are connected through the elements 178 to the negative power line 142, etc. The elements 178, 180 and 182 may be electromagnetic actuators which may be employed to press the keys on a suitable decimal adding or calculating machine to prepare a cumulative record of the volumes of articles passing over the conveyor 10; alternatively the elements 178–182 may be lamps which illuminate the proper numerals indicating the volume of the article 24. Depending on the particular type of adding or calculating machines employed in conjunction with the apparatus illustrated herein, suitable switches may be provided for actuating the total or sub-total keys of the adding or calculating machine, and for this purpose the magnetic actuator 184 in the negative power lead 142 may be employed whereby the volume of each article 24 will be added to the adding machine sub-total when the container length-measuring members are moved to operating position with the switches 106 and 108 closed.

The device illustrated above provides a simple, economical and reliable tool for rapidly measuring the volumes of articles passing along a conveyor. If in a particular installation, the use of more expensive equipment is permissible, the device of this invention can be made of suitable electronic components which may be faster acting and provide far more rapid calculation of the volumes of containers while using the principles of the invention. Specifically, the mechanical means for measuring the length and height of the container 24 may be replaced by lines of photoelectric cells positioned horizontally and vertically, respectively, in the back panel 16 adjacent to the stop 18, and the mechanical means for measuring the width of the article may be replaced by a line of photoelectric cells in the floor of the conveyor extending across the conveyor; the photoelectric cells are each connected to operate a relay having a plurality of pairs of contact terminals with each relay replacing one of the groups of switches 110 to 132, etc. The relay for each unit of magnitude of a dimension is provided with an extra pair of switch contacts which are connected to de-energize the relays used for the smaller units of magnitude of that dimension. Measurement of the minimum rectangular volume to be occupied by each article can be assured with this species of the invention by employing a two-dimensional bank of photoelectric cells for measuring each dimension with an edge of the bank positioned along the edge of the conveyor near the back panel 16; the cells of the bank are wired through the multiterminal relays so that the cell farthest from said edge of the conveyor which is affected by the article 24 will determine the magnitude of the dimension measured.

While one specific embodiment of this invention has been illustrated and described in detail herein, it is obvious that many modifications of the structure and mode of operation of the device illustrated herein may be made without departing from the spirit and scope of the invention.

I claim:

1. Apparatus for measuring the volume of articles which comprises a conveyor defining an elongated path along which said articles move, a releasable stop mounted intermediate of the ends of said conveyor in the path of articles on said conveyor for stopping articles at a reference point in said path, first and second measuring means mounted adjacent to said reference point for measuring the dimensions of articles on said conveyor in a plane generally perpendicular to said path, third measuring means for measuring the distance along said path which an article extends from said stop, electrical means for multiplying together the dimensions measured by said three measuring means, power output means for recording the multiplication product calculated by said multiplying means, and means for releasing said stop to permit articles to move along said path from said reference point.

2. The apparatus of claim 1 characterized further in that said first and second measuring means comprise cams mounted in said path and positioned to be engaged and moved by articles moving along said path to said reference point.

3. The apparatus of claim 2 in which said third measuring means comprises a contact member mounted for movement longitudinally of said path to permit adjustment of its distance from said stop and mounted for movement laterally into said path to facilitate its engagement with articles therein and laterally out of said path to permit movement of articles along said path.

4. The apparatus of claim 1 characterized further in that said power output means includes a plurality of electric current responsive elements arranged to indicate by the actuation of combinations thereof, the decimal magnitude of the volume of articles passed over said conveyor.

5. Apparatus for measuring the volume of articles which comprises a conveyor defining a path along which said articles move, a releasable stop member mounted intermediate of the ends of said conveyor in the path of articles on said conveyor for stopping articles at a reference point on said conveyor, first and second measuring means for automatically measuring the vertical and horizontal dimensions of articles on said conveyor in a plane perpendicular to said path, third measuring means for measuring the dimension of an article on said conveyor in a direction parallel to said path with said article in engagement with said stop, electrical means for multiplying together the dimensions measured by said three measuring means, electrical means for indicating the multiplication product calculated by said multiplying means, switch means associated with said indicating means for preventing operation of said indicating means except when an article is contacting said stop member, and means for releasing said stop to permit articles to move along said path from said reference point.

6. The apparatus of claim 5 characterized further in that said first and second measuring means comprise cams mounted in said path and positioned to be engaged and moved by articles moving along said path to said reference point.

7. The apparatus of claim 6 in which said third measuring means comprises a contact member mounted for movement longitudinally of said path to permit adjustment of its distance from said stop member and mounted for movement laterally into said path to facilitate its engagement with articles therein and laterally out of said path to permit movement of articles along said path.

8. The apparatus of claim 7 in which said switch means comprises a pair of limit switches facing each other and mounted on said stop member and said third measuring means.

9. Apparatus for measuring the volume of articles which comprises a conveyor defining a path along which said articles move, a releasable stop mounted intermediate of the ends of said conveyor for stopping articles at a reference point on said conveyor, first and second measuring means for automatically measuring the vertical and horizontal dimensions of articles on said conveyor in planes perpendicular to said path, third measuring means for measuring the dimensions of articles in a direction parallel to said path, each of said measuring means having a plurality of groups of switches, a different one of said groups of switches being closed by said measuring means for each different unit of magnitude of the dimension measured by said means, circuit means interconnecting the groups of switches controlled by two of said measuring means and including a plurality of partial product leads each connected through said groups of switches to be energized for a particular product of the two dimensions measured by said two measuring means, second circuit means including two groups of ten output leads, one group having a lead for each unit and the second group having a lead for each decade, selected ones of said output leads being connected to be energized upon the concurrent closing of one group of switches in the remaining measuring means and energization of a particular partial product lead, said selected ones of said output leads corresponding to the decade and unit numbers which represent the product of the number represented by said energized partial product lead and the number represented by said closed group of switches, output means connected to said output leads for indicating the decimal numbers corresponding to said selected output leads, and means for releasing said stop to permit articles to move along said path from said reference point.

10. The apparatus of claim 9 characterized further by the inclusion of switch means associated with said indicating means for preventing operation of said indicating means except when an article is contacting said stop member and said third measuring means is in operating position.

11. The apparatus of claim 9 in which said third measuring means comprises a contact member mounted for movement longitudinally of path to permit adjustment of its distance from said stop member, mounting means for permitting movement of said contact member laterally into said path to contact articles in said path and laterally out of said path to permit movement of articles along said path, and switch operating means connected to said contact member to be moved thereby, said switch operating means having a plurality of switch contacts positioned to close the groups of switches controlled thereby.

12. The apparatus of claim 11 characterized further by the inclusion of a plurality of relays with the coils thereof connected to said partial product leads through said group of switches to be energized upon the energization of said partial product lead at the same time that said switch operating means closes the group of switches associated therewith, the switch contacts of said relays being connected to said selected ones of said output leads to energize the latter upon closing of said relays.

13. The apparatus of claim 12 characterized further by the inclusion of a pair of normally open limit switches facing each other and mounted on said stop member and said contact member, said limit switches being connected in series with said output leads to prevent current flow through said output leads except when an article is positioned between said limit switches.

References Cited in the file of this patent

UNITED STATES PATENTS

| | | |
|---|---|---|
| 2,630,043 | Kolisch | Mar. 3, 1953 |
| 2,727,391 | Kolisch | Dec. 20, 1955 |
| 2,828,917 | Wheeler et al. | Apr. 1, 1958 |
| 2,860,420 | Denman et al. | Nov. 18, 1958 |